United States Patent
Someya et al.

[11] 3,897,998
[45] Aug. 5, 1975

[54] DEFINITION CORRECTING DEVICE INCORPORATED IN A MECHANISM FOR THE AXIAL ADJUSTMENT OF COMPONENTS OF AN OPTICAL SYSTEM

[75] Inventors: Atsushi Someya; Michiharu Suwa; Mamoru Shimazaki, all of Tokyo, Japan

[73] Assignee: Canon Kabushiki Kaisha, Tokyo, Japan

[22] Filed: June 4, 1973

[21] Appl. No.: 366,527

[30] Foreign Application Priority Data
June 23, 1972 Japan.................................. 47-63038

[52] U.S. Cl.................................. 350/187; 350/255
[51] Int. Cl. ............................................. G02b 7/10
[58] Field of Search.................... 350/187, 255, 252

[56] References Cited
UNITED STATES PATENTS
| | | | |
|---|---|---|---|
| 1,950,166 | 3/1934 | Durholz | 350/187 X |
| 2,381,098 | 8/1945 | Bahn | 350/255 |
| 2,984,167 | 5/1961 | Staubach | 350/187 UX |

*Primary Examiner*—John K. Corbin
*Attorney, Agent, or Firm*—Toren, McGeady and Stanger

[57] ABSTRACT

A definition correcting device arranged in a mechanism for relative adjustment of axially spaced movable components of an optical system, comprising means for rigidly securing said components in order to axially move the components, operable means capable of displacing the said securing means along the optical axis and definition adjusting means adapted for the operation of definition correction, and of correcting the definition of the movable components independently of both the relative adjustment of the axially spaced movable securing means and the operation of the operable means, whereby the definition correction eliminates the influence of mechanical errors associated with the said securing means and operable means.

15 Claims, 11 Drawing Figures

DEFINITION CORRECTING DEVICE INCORPORATED IN A MECHANISM FOR THE AXIAL ADJUSTMENT OF COMPONENTS OF AN OPTICAL SYSTEM

This invention relates to a definition correcting device incorporated in a control mechanism for axial adjustment of components of an optical system. More particularly, the invention relates to such a device which corrects the definition of axially spaced movable lens elements such as those employed in cameras and the like employing zoom lenses.

In the zoom objectives, there is a requirement that the equivalent focal length of the objective be continuously varied throughout a range whilst maintaining the coincidence of the focal plane with the surface of a photographic material. This requirement, however, is not always satisfied due to the deviation from the specified tolerances for constructional parts, or due to the inaccuracy in assembly thereof. These mechanical errors cause the focal plane of the zoom objective associated therewith to erroneously shift from the photographic film plane during the zooming, no matter how accurately a focusing adjustment based on the distance measuring technique is effected in the zoom objective, so that photographs lacking sharpness due to the image shift error are obtained. In the prior art zoom control mechanisms, such image shift errors as arising during the zooming have been prevented merely by specifying severely tolerances for each constructional part. In modern zoom objectives, however, a greatly increased zoom ratio must be embodied therein and the tolerances must therefore be specified more severely, as a result of which the accuracy which exceeds the limitations of process ability of machining the constructional parts within their specified tolerances has been required for the achievement of the desired optical performance.

In order to moderate such severe specification of tolerances for each constructional part, this invention contemplates a device capable of compensating for the image shift error throughout the entire zooming range of a zoom objective. The feature of this invention resides in that a good compensation for the image shift error can be achieved by a fine definition adjustment of interval between at least two movable lens components, and in that for the purpose of the above-mentioned fine definition adjustment, a zoom control mechanism including a cam annulus or cam members corresponding thereto for the axial displacement of lens components is constructed either in such a manner that at least two cam members are arranged to be rotatable and/or slidable with respect to one another in order that such cam members are accurately oriented, or in such a manner that cam followers engaging in the camming slots of an integral cam annulus are adjustably mounted on movable rings for securing rigidly said movable lens components so that each cam follower may be accurately positioned relative to the other by moving the cam follower on the ring in a small distance in the direction of rotation about the optical axis and/or in the direction longitudinal to the optical axis. Moreover, this positioning operation can be made from the outside of the cam annulus.

The present invention will be described in detail referring to the attached drawings.

Figure 4A:
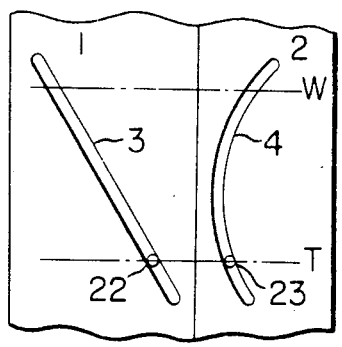
Figure 4B:
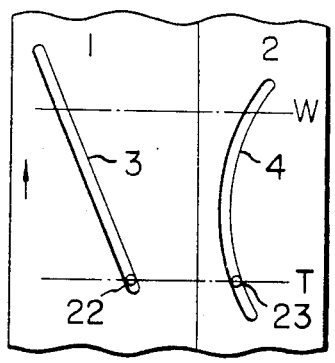

FIGS. 4(a) and 4(b) are schematic illustrations of the device of the invention taking place before and after an operation of definition correction respectively.

Figure 5:
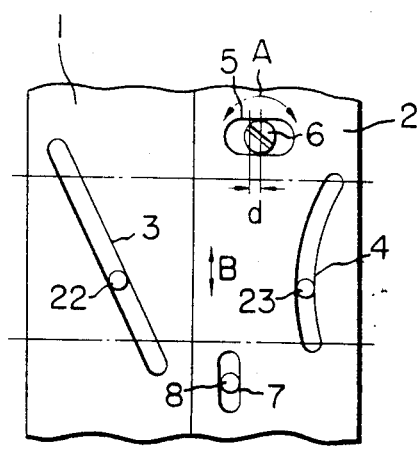
Figure 6:
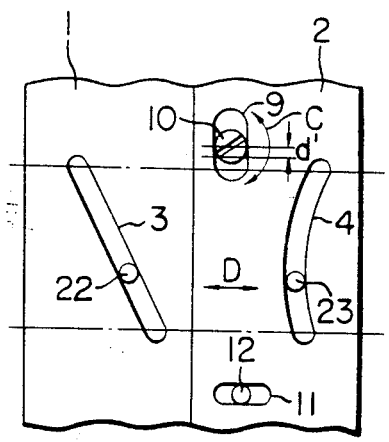

FIGS. 5 and 6 are schematic illustrations of the device according to two different embodiments of the invention.

Figure 7:
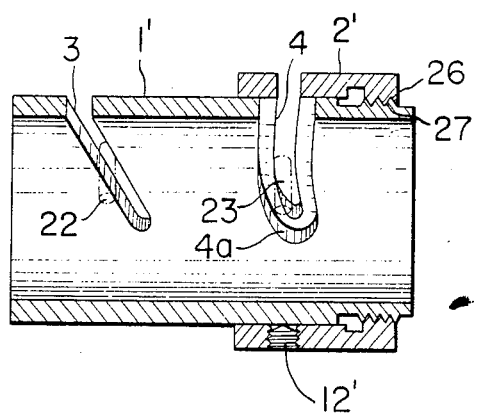
Figure 8:
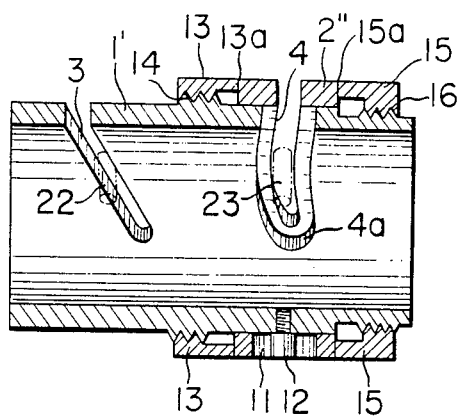

FIGS. 7 and 8 are vertical sections of the device according to two other different embodiments of the invention.

Figure 9:
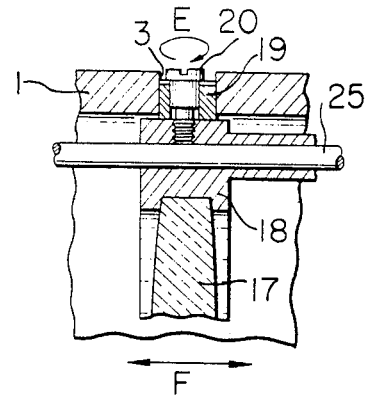

FIG. 9 is a fragmentary vertical section of the device according to an embodiment of the other type of the invention.

Figure 10:
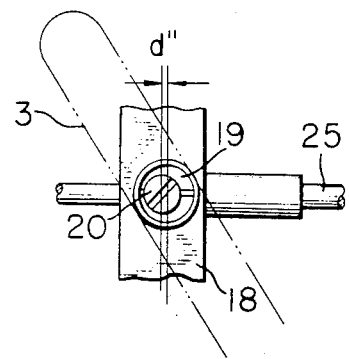

FIG. 10 is a top view of the embodiment shown in FIG. 9.

Figure 1:
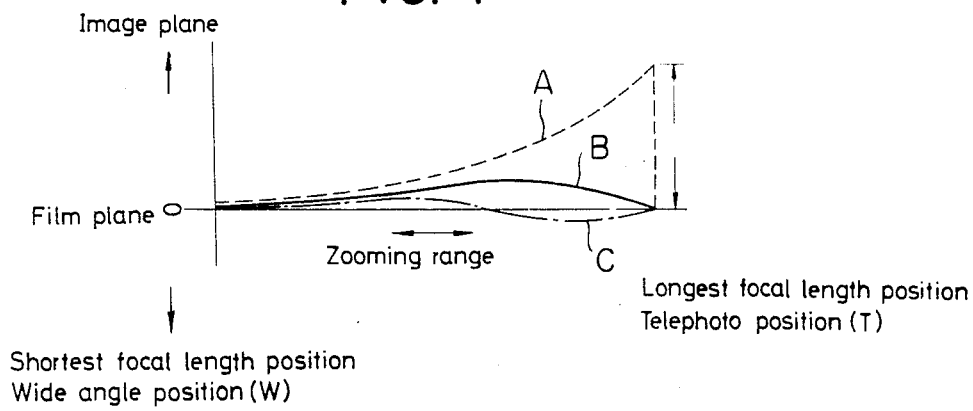
FIG. 1 is a graph illustrating variations of image shift of a varifocal lens system with respect to the focal length positions.

In general, when the $i$-th lens component of a zoom objective consisting of $k$ lens components is displaced through an infinitesimal distance $\delta$, a magnitude $\epsilon$ of image shift error caused thereby from the film plane may be expressed by the following equation: $\epsilon = \delta (1 - mi^2) M^2_{i+1, k}$ (wherein $mi$ is a magnifying power of the $i$-th lens component, and $M_{i+1, k}$ is an overall magnifying power of the lens components following $(i+1)$th lens component) The values of $mi$ and $M_{i+1, k}$ are different at different focal length positions of the zooming range so that if one of the lens components is deviated from its normal position, the magnitude of image shift error, $\epsilon$, is different at different focal length positions of the zooming range. As a result, the magnitude, $\epsilon$, varies with variation in the focal length, as shown by broken lines A in FIG. 1, wherein the abscissa denotes variable focal length of a zoom objective, while the ordinate denotes the deviation of the image plane of the zoom objective from the film plane. The definition adjustment of the components in assembly, a focusing test for the assembled zoom objective is made usually at the wide angle position (W) and telephoto position (T) at which the image plane coincides with the photographic film plane. After this definition adjustment, the image plane will coincide with the film plane throughout the entire zooming range, if the lens components are located in their respective normal positions. If the lens components are otherwise located, the image plane is deviated from the film plane in an intermediate range of the zooming region as shown by the solid line in FIG. 1, although the coincidence is effected at the wide angle and telephoto positions. The most preferable method of compensating for the image shift error is such that the lens component which has been defined incorrectly is returned to its original position. But in practice, when once a zoom objective is assembled, the definition adjustment of any lens components cannot be made without disassembling it.

Figure 2:
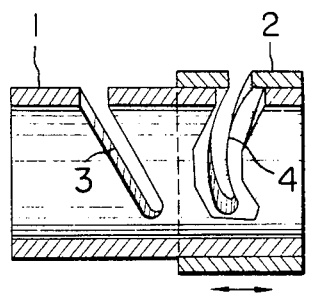
FIG. 2 is a sectional view of the definition correcting device in the basic form of the invention.

To the end that the definition adjustment operation is performed simply from the outside of the zoom objective without the necessity of disassembling it, according to the preferred embodiment of this invention, as illustrated in FIG. 2 an integral cam annulus is composed of a pair of cam members 1 and 2, one of which provides a camming slot 3 for governing the axial movement of at least one movable lens component, and the other providing a camming slot 4 for governing the axial movement of the rest of the movable lens components. One of these cam members is adjustably secured to the other so that such cam members can be accurately oriented with respect to each other with the result of an accomplishment of due definition correction of the assembled lens component without disassembling them, whereby the orientation resulted is substantially equal in effect to the definition correction resulted.

Figure 3:
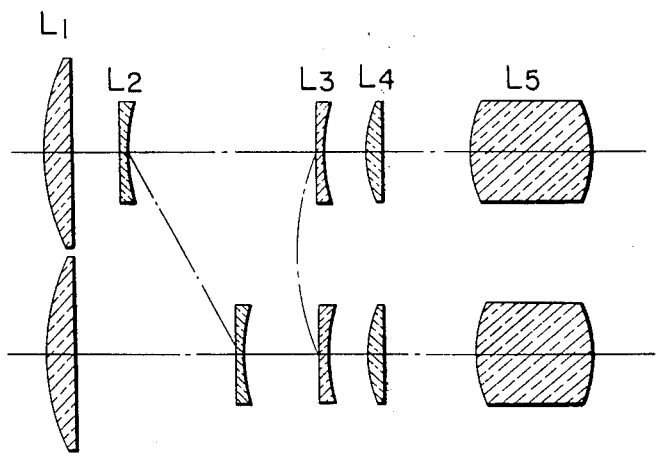
FIG. 3 shows lens block diagrams illustrating one example of lens adjustment of a varifocal lens system.

In the case of a zoom control mechanism adapted for a zoom lens system in which the lens components are simultaneously displaceable along the optical axis, for example, as shown in FIG. 3, to the end that the image shift error caused by the location error of $L_2$ (zoom control lens component) is eliminated, according to this invention, one of the two cam members 1 and 2 oriented as shown in FIG. 4(a), for example, the cam member 1 is offset from the other cam member 2 in the direction of rotation (see FIG. 4(b)), or along the optical axis, as a result of which the interval between the zoom control lens component $L_2$ and a focusing lens component $L_3$, both being governed by the zoom control mechanism, is corrected at all stations of lens adjustment for the zooming. If the attitude of one of the camming slots is linear, the rotational offset orientation and axial offset orientation have the same effect on the lens adjustment for the zooming. If the attitudes of both the camming slots are of curvature, the rotational offset orientation has a somewhat different correction effect than the axial offset orientation has. Now assuming that a zoom control mechanism causes image shift errors to occur as shown by solid line B in FIG. 1, the image shift error can be completely eliminated throughout the entire zooming range by offsetting the cam member 1 from the cam member 2 in the direction of rotation at a very small angle, inasmuch as the accurate focusing adjustment is effected at the wide angle and telephoto positions. On the other hand, in the case of the attitudes of both the camming slots 3 and 4 are of curvature, when the cam member 1 is offset from the cam member 2 by rotation and the focusing adjustment is effected at only the wide angle and telephoto positions, the image shift errors cannot be completely eliminated in intermediate positions of the zooming range, being varied in S-shaped curve as shown by broken line C in FIG. 1. However, even in this case, the magnitudes of image shift errors are small as compared with those shown by solid line B, falling within the depth of focus. The combination of such a rotational offset and axial offset will effect a good compensation for the image shift errors due to almost all the mechanical errors in assembly.

Having described the basic construction and its performance according to the invention, several embodiments of the device of the invention and their performance are explained hereinbelow in greater detail.

FIG. 5 and FIG. 6 illustrate extended views of the compound cam annuli of practical construction incorporated in a zoom control mechanism of which the principle was explained with reference to FIGS. 4(a) and 4(b). The interval between movable lens components at all the stations of lens adjustment can be altered by varying the rigidly spaced relationship between the camming slots 3 and 4 disposed on a compound cam annulus consisting of the cam members 1 and 2. In FIG. 5, the cam members 1 and 2 provide respectively camming slots 3 and 4 of which the attitudes are shown in the figure by way of example. The cam member 2 is provided with a slot 5 in which an eccentric pin 6 rotatably mounted on the cam member 1 rotatably engages, and another slot 7 arranged so as to permit the cam member 2 to offset transversely to the optical axis, in which pin 8 planted on the cam member 1 slidably engages, so that a clockwise or counter-clockwise rotation of eccentric pin 6 will move the cam member 2 relative to the cam member 1 in slidable engagement of the pin 8 with the slot 7 in the direction (indicated by arrow B) of rotation about the optical axis, the maximum amount of movement depending on the eccentricity $d$ of an eccentric pin 6. By this rotational offset orientation, the variably spaced relationship at all the stations of lens adjustment can be correctly established between the movable lens components $L_2$ and $L_3$ which are urged to move by means of cam followers 22 and 23 rigidly secured thereto engaging in the camming slots 3 and 4 disposed on the cam member 1 and 2 respectively.

FIG. 6 shows a modification of the device shown in FIG. 5, wherein a cam mechanism is constructed in such a manner that cam member 2 is arranged to be movable in the direction substantially equal to that of the optical axis. In the drawings following this figure, like reference characters indicate like or corresponding parts. Referring to FIG. 6, an eccentric pin 10 is rotatably mounted on the cam member 1 rotatably engaging in a slot 9 disposed in the cam member 2. The eccentric pin 10 may be operated from the outside of the cam member 2. Planted on the cam member 1 is a pin 12 which slidably engages in a slot 11 of the cam member 2, said slot 11 being arranged so as to permit the cam member 2 to move along the optical axis. A clockwise or counter-clockwise rotation of the eccentric pin 10 will move the cam member 2 in slidable engagement of the pin 12 with the slot 11 in the direction (indicated by arrow D), the maximum amount of movement depending on the eccentricity $d'$ of the eccentric pin 10. By this axial offset orientation, the variably spaced relationship at all the stations of lens adjustment can be correctly established between the movable lens components $L_2$ and $L_3$ which are urged to move by means of the cam followers 22 and 23 engaging in the camming slots 3 and 4 disposed on the cam member 1 and 2 respectively.

FIG. 7 shows another embodiment of the device of this invention with a modification in the compound cam annulus, wherein an integral cam annulus 1' is provided with an externally-threaded portion 27, with which an internally-threaded portion 26 provided on a cam ring 2' engages, so that the cam ring 2' is adjustably positioned relative to the cam annulus 1'. As explained with reference to FIGS. 5 and 6, the cam annulus 1' (which when extended is identical to cam member 1) is provided with the camming slot 3 in which the cam follower 22 engages slidably, while the cam ring 2' (which when extended is identical to cam member 2) is provided with the camming slot 4 in which the cam follower 23 engages slidably. The cam annulus 1' is provided with an over-slotted portion 4a just under the camming slot 4 in order that the cam follower 23 may be effectively operative in engagement with the camming slot 4. This construction enables the accurate positioning of the cam ring 2' on the cam annulus 1' with their threaded portions by means of rotation of the cam ring 2' as an adjusting ring to define the interval between the camming slots 3 and 4. After such definition adjustment, the cam ring 2' is fixed on the cam annulus 1' by means of a screw fastener 12'.

FIG. 8 shows still another embodiment of the device of this invention wherein the definition adjustment for a compound cam annulus is made along the optical axis. Referring to FIG. 8, a cam ring 2″ having a camming slot 4 is slidably secured on the integral annulus 1' shown in FIG. 7, so that the camming slot 4 is adjustably positioned relative to the camming slot 3 by sliding it along the optical axis. To define the cam ring 2″, two internally threaded adjusting rings 13 and 15 are arranged in engagement with externally threaded portions 14 and 16 of the cam annulus so as to hold the cam ring 2″ therebetween. This arrangement permits the cam ring 2″ to slidably move toward or away from the camming slot 3 so long as the camming slot 4 of the cam ring 2″ is positioned on an overslotted portion 4a provided in the cam annulus 1', thereby the interval between the camming slots 3 and 4 is varied. To the end that camming slots 3 and 4 are adjustably positioned relative to each other, for example, in a shorter interval than that shown in FIG. 8, firstly an adjusting ring 13 near to the camming slot 3 is rotated toward the camming slot 3 to make a gap from the cam ring 2″, and secondly another adjusting ring 15 farther from camming slot 3 is rotated toward the camming slot 3, pushing the cam ring 2″ toward the camming slot 3 in contact with a shoulder 15a of the adjusting ring 15 until the interval between camming slots 3 and 4 reaches a predetermined one, and finally the first adjusting ring 13 is rotated toward the cam ring 2″ to secure rigidly the cam ring 2″ between the adjusting rings 13 and 15, whereby the cam ring 2″ is defined against the shoulders 13a and 15a. In order that the cam ring 2″ is made slidable only in the direction of the optical axis, there is provided a guide means consisting of the pin 12 and slots 11 as shown in FIG. 6.

FIG. 9 and FIG. 10 show another embodiment of the device of the invention, wherein while the interval between the camming slots 3 and 4 cannot be varied, the cam followers slidably engaging in the camming slots are adjustably mounted on lens holding frames so that movable lens components are correctly positioned by a fine definition adjustment of the frame. In FIGS. 9 and 10, the arrangement is illustrated as concerning only one camming mechanism including camming slot 3, an eccentric roller 19 as a cam follower and a frame 18 of a lens element 17, said frame 18 being urged to move axially by means of a cam follower slidably engaging in camming slot 3. But it is to be understood that the other camming mechanism adapted for the camming slot 4 may be constructed in the same manner as above. Referring to the figures, an eccentric roller 19 as a cam follower slidably engages in the camming slot 3 disposed in an integral cam annulus 1, and said eccentric roller 19 is fixed to a lens holding frame 18 by means of a screw fastener 20. The frame 18 in which a lens element 17 is rigidly secured is allowed to move only in the direction of the optical axis by means of a guide means 25. This construction enables the axial offset definition adjustment between a movable lens element 17 and another movable lens element not shown in such a manner that the fixed screw fastener 20 is released to make the eccentric roller 19 rotatable and then a rotation of the eccentric roller 19 will cause the central axis of a screw fastener 20 to shift within an eccentricity $d''$ so that the lens holding frame 18 is axially movable in slidable engagement with a guide rod 25 in a small distance to define the interval between the movable lens components. After the definition adjustment, the screw fastener is fixed so that the axial adjustment of components of an optical system is governed in accordance with the attitude of the camming slots.

It will be seen from the foregoing description that the construction of the described embodiments of the invention enables the definition adjustment of the variably spaced movable components of an optical system independently from the axial adjustment of zoom operable means carrying said movable components therewith, with the result that the mechanical errors of the operable means can be effectively eliminated and that the inaccuracy due to the inability of machining constructional parts within the specified tolerances can be effectively cancelled, so that a good compensation for the image shift errors is effected throughout the entire zooming range.

To increase the definition correcting ability range of the device of the invention, two or more modes of definition adjustment described in reference to FIG. 5 through FIG. 10 may be combined to solve not only large definition corrections, but also complex definition corrections. For example, when both of the camming slots 3 and 4 have non-linear attitudes, a separate employment of the embodiment of the definition correcting device described in reference to FIG. 5 or FIG. 6 does not permit, in some cases, the desired definition adjustment, because each embodiment has generally a different definition correcting mode from those of the other embodiments. But any definition correcting mode by which a desired optical performance is obtained will be found in the combinations of the embodiments described above.

Since certain changes and modifications may be made in the above device without departing from the scope of the invention, it is intended that all the constructional parts described above and shown in the drawings shall be interpreted as illustrative and not in a limiting sense. For example, a pair of cam disks may be used instead of cam members 1 and 2, and the camming slots 3 and 4 may be substituted by surface cams, although not shown.

What is claimed is:

1. An optical instrument having at least first and second optical components positioned in aligned, longitudinally spaced relation along an optical axis, which comprises, in combination, said first and second optical components being lenses, a first lens holding member securing said first optical component for movement along the optical axis, a second lens holding member securing said second optical component for movement along the optical axis, a first cylinder having a first guiding portion engageable with said first lens holding member, a second cylinder having a second guiding portion engageable with said second lens holding member, means releasibly coupling said first and second cylinders for operation in a predetermined synchronous manner to simultaneously move said first and second lens holding members in predetermined relation to vary the optical response of the instrument, and means for independently positioning said first and second cylinders when said coupling means are released, said positioning means including a third guiding portion defining a predetermined range of adjustment of the axial spacing between the first and second lens holding members, and an adjusting member cooperable with the third guiding portion to selectively set the axial spacing between the first and second lens holding members at any desired position within such predetermined range of adjustment, said adjusting member having means for continuously changing the distance between the first and second guiding portions along the optical axis in order to eliminate, when adjusted, optical effects resulting from manufacturing errors of said guiding portions.

2. An instrument as defined in claim 1, in which the third guiding portion of said positioning means includes a groove formed in one of the first and second cylinders.

3. An instrument as defined in claim 1, in which the third guiding portion of said positioning means is oriented in the direction of the optical axis.

4. An instrument as defined in claim 1, in which the third guiding portion of said positioning means is oriented in a direction transverse to the optical axis.

5. An instrument as defined in claim 1, in which the adjusting member of said positioning means includes an eccentric pin fixed to at least one of said first and second carrier members.

6. An instrument as defined in claim 1, in which said positioning means is provided with a locking member for securing the adjusting member at a position corresponding to a desired relative position of said first and second carrier members within the predetermined range.

7. An optical instrument having first and second optical components movably positioned in aligned, longitudinally spaced relation along an optical axis, which comprises, in combination, a cam tube having first and second cam grooves, defining a predetermined pattern of movement of said first and second components, said first and second components being lenses, first and second lens holding members respectively engageable within said first and second cam grooves to individually secure said first and second components, means releasibly secured to said first and second lens holding members for imparting simultaneous movement thereof within the associated cam grooves in accordance with said predetermined pattern, and means for independently positioning at least one of said first and second lens holding members when said imparting means are released to continually adjust the axial spacing of said one lens holding member with respect to the other lens holding member within a predetermined range of adjustment, said positioning means for continuously changing the distance between the first and second cam grooves along the optical axis being adjustable in order to eliminate, when adjusted, effects on the optical system resulting from manufacturing error of the cam grooves.

8. An instrument as defined in claim 7, in which said components are lenses of variable focal length.

9. An instrument as defined in claim 7, in which said positioning means includes a cam ring cooperable with said cam tube.

10. An instrument as defined in claim 7, in which said positioning means is provided with a groove portion to define the limits of the predetermined range of adjustment and a follower portion cooperable with the groove portion to axially position said one carrier member within the predetermined range of adjustment.

11. An optical instrument having at least first and second lenses movably positioned in aligned, longitudinally spaced relation along an optical axis, which comprises, in combination, a first cam ring having a first cam groove for moving said first lens along the optical axis in a predetermined pattern, a second cam ring having a second cam groove for moving said second lens along the optical axis in a predetermined pattern, means for releasibly coupling said first and second cam rings with the cam groove thereof disposed in predetermined relation, and means for independently positioning said first and second cam rings relative to each other when said coupling means are released for varying the spacing between said first and second cam grooves in the direction of the optical axis, said positioning means being adjustable for continuously changing the distance between the first and second cam rings along the optical axis in order to eliminate, when adjusted, effects on the optical system resulting from manufacturing error of the cam grooves.

12. A zoom lens system having at least first and second lenses movably positioned in aligned, longitudinally spaced relation along an optical axis whereby the simultaneous movement of said lenses along the optical axis in a predetermined relationship is effective to vary the focal length of the system while keeping its image plane constant, which comprises, in combination, guide means having first and second cam grooves for defining a predetermined zooming range of the first and second lenses, first and second lens holding means individually supporting the first and second lenses and respectively engageable within the first and second cam grooves, means for releasibly coupling the first and second lens holding means for simultaneous movement thereof within the associated cam grooves over the zooming range, and means for independently positioning one of said lens holding means relative to the other of said lens holding means when said coupling means is released to adjust the relative spacing of said first and second lenses at any point within the zooming range, said positioning means being adjustable for continuously changing the distance between the first and second cam grooves along the optical axis in order to eliminate, when adjusted, effects on the optical system resulting from manufacturing error of the cam grooves.

13. In an optical instrument having an optical axis, a first lens movable along the optical axis, a second lens movable along the optical axis, a first cam ring engageable with said first lens and including a first cam groove defining the course of movement of said first lens and a second groove axially spaced from said first groove and having an axial extent wider than that of said first groove, a second cam ring engageable with said second lens and including a portion slidably mounted on said first cam ring, said portion being provided with a third cam groove receivable within said second groove, means for releasibly coupling said first and second cam rings, and means operable when said coupling means are released for independently positioning said second cam ring axially with respect to said first cam ring within a predetermined range defined by the axial range of movement of said third groove within said second groove.

14. An instrument as defined in claim 13, in which said positioning means is provided with a locking member to secure said second cam ring with respect to said first cam ring to any point within said predetermined range.

15. An instrument as defined in claim 13, in which said positioning means is provided with cooperable camming means on said first and second cam rings for continually adjusting the relative position of said second cam ring within said predetermined range.

* * * * *